(12) United States Patent
Tominaga et al.

(10) Patent No.: US 9,992,980 B2
(45) Date of Patent: Jun. 12, 2018

(54) SMALL ANIMAL REARING CONTAINER

(71) Applicant: KABUSHIKI KAISHA TOMINAGA JYUSHI KOGYOSHO, Osaka (JP)

(72) Inventors: Kazutoshi Tominaga, Osaka (JP); Hikaru Nakagawa, Osaka (JP)

(73) Assignee: KABUSHIKI KAISHA TOMINAGA JYUSHI KOGYOSHO, Osaka (JP)

(*) Notice: Subject to any disclaimer, the term of this patent is extended or adjusted under 35 U.S.C. 154(b) by 190 days.

(21) Appl. No.: 15/111,856

(22) PCT Filed: Jan. 5, 2015

(86) PCT No.: PCT/JP2015/050043
§ 371 (c)(1),
(2) Date: Jul. 15, 2016

(87) PCT Pub. No.: WO2015/107917
PCT Pub. Date: Jul. 23, 2015

(65) Prior Publication Data
US 2016/0330940 A1    Nov. 17, 2016

(30) Foreign Application Priority Data
Jan. 17, 2014   (JP) .................................. 2014-006411

(51) Int. Cl.
A01K 63/00        (2017.01)
A01K 1/03         (2006.01)

(52) U.S. Cl.
CPC .............. *A01K 63/003* (2013.01); *A01K 1/03* (2013.01)

(58) Field of Classification Search
CPC ...... A01K 1/0236; A01K 1/0245; A01K 1/03; A01K 1/031; A01K 1/032; A01K 1/033;
(Continued)

(56) References Cited

U.S. PATENT DOCUMENTS 3,786,781 A * 1/1974 Poulsen ............... A01K 63/006
                                                              119/246
5,134,969 A    8/1992 Mason et al.
(Continued)

FOREIGN PATENT DOCUMENTS

JP    H10-117625 A    5/1998
JP        3110647 U    6/2005

OTHER PUBLICATIONS

International Search Report dated Jan. 29, 2015, issued in corresponding PCT/EP2014/075850, 3 pages.
(Continued)

*Primary Examiner* — Trinh T Nguyen
(74) *Attorney, Agent, or Firm* — Millen, White, Zelano & Branigan, P.C.; William Nixon

(57) ABSTRACT

A small animal rearing container allows viewing small animals in corner portions. The small animal rearing container includes a base having a substantially box shape with an opened upper end, a peripheral wall extending upward from the outer edge of the base, a fixing frame coupled to an upper end opening edge of the peripheral wall, and a cover plate coupled to the fixing frame. The peripheral wall has a plurality of glass plate wall members coupled together. The peripheral wall includes a porous sheet having air permeability. The cover plate includes a porous sheet having air permeability. The peripheral wall includes a window plate. The wall member constituting a corner portion and a vicinity of the corner portion of the peripheral wall among the plurality of wall members includes a bent glass plate. A bent portion of the bent glass plate is arranged at the corner portion.

6 Claims, 9 Drawing Sheets

(58) Field of Classification Search
CPC ...... A01K 1/034; A01K 31/18; A01K 31/002;
A01K 31/005; A01K 31/06; A01K 31/07;
A01K 63/003
See application file for complete search history.

(56) References Cited

U.S. PATENT DOCUMENTS

| | | | | |
|---|---|---|---|---|
| 5,135,400 | A * | 8/1992 | Ramey | A01K 63/003 119/246 |
| 5,713,304 | A * | 2/1998 | de Vosjoli | A01K 63/003 119/266 |
| 5,794,567 | A | 8/1998 | Itzhak | |
| 6,067,939 | A * | 5/2000 | Tominaga | A01K 1/03 119/474 |
| 7,481,183 | B2 * | 1/2009 | Van Heygen | A01K 63/003 119/246 |
| 9,867,364 | B2 * | 1/2018 | Keller | A01K 63/006 |
| 2002/0100429 | A1 | 8/2002 | Wade | |
| 2005/0076854 | A1 * | 4/2005 | Passno | A01K 1/03 119/500 |
| 2006/0225663 | A1 * | 10/2006 | Chiang | A01K 63/003 119/452 |
| 2014/0230740 | A1 * | 8/2014 | Mihlbauer | A01K 1/03 119/246 |
| 2014/0251227 | A1 * | 9/2014 | Wang | A01K 63/003 119/266 |

OTHER PUBLICATIONS

"Pantheon White Toriatsukai Setsumeisho", URL: https://web.archive.org/web/20130503200523/http://www.sanko-wild.com/insect/z_pddf/pantheon_manual_e04.pdf, retrieved Mar. 16, 2015, 2 pages.

Tomofuji, Y., Microfilm of the specification and drawings annexed to the request of Japanese Utility Model Application No. 140679/1986 (Laid-open No. 48461/1988), 19 pages.

Pantheon White WH4045, URL: https://web.archive.org/web/20130503200523/http://www.sanko-wild.com/insect/c_e04.pdf, retrieved Mar. 16, 2015, 3 pages.

English Translation Abstract of JPH10-117625A published May 12, 1998, 1 page.

* cited by examiner

SMALL ANIMAL REARING CONTAINER

TECHNICAL FIELD

The present invention relates to a small animal rearing container for use in rearing small animals, such as, e.g. turtles.

BACKGROUND ART

When rearing small animals at home, it is preferable to select an appropriate rearing container by carefully considering the biology and/or behavior of animals to be reared. However, a container for use in rearing relatively minor small animals, such as, e.g., turtles, snakes, crocodiles, lizards, scorpions, spiders, snails, and dragonflies, is less likely to come onto the market as a mass-produced product because of the small market size. For this reason, in the case of rearing small animals as mentioned above, it is normal to use, as a rearing container, an existing commercially available container, such as, e.g., an insect cage, a birdcage, and an aquarium, or a rearing container made by a user by utilizing, e.g., the aforementioned commercially available container.

Under the circumstance, a small animal rearing container for use in rearing a relatively minor small animal as mentioned above is disclosed in Patent Document 1.

In this small animal rearing container, the front and rear walls and right and left walls each made of a transparent plate are assembled on the outer peripheral edge of the bottom wall, and the cover plate having a mesh sheet is arranged at the upper end opening section in an openable and closable manner. Further, the right and left walls are each provided with window plates which are arranged in an openable and closable manner so that the degree of ventilation in the container can be adjusted by opening and closing operations, etc., of the window plates to thereby provide a comfortable environment for small animals to be reared therein.

PRIOR ART DOCUMENTS

Patent Documents

Patent Document 1: Japanese Utility Model Registration No. 3110647

SUMMARY OF THE INVENTION

Problems to be Solved by the Invention

In the meantime, small animals to be reared in a container have various behaviors depending on the species of animals. For example, there are many small animals having a hiding behavior to maintain a low profile. When kept in the rearing container, such small animals sometimes stay unmoved at the corner portion in the rearing container.

On the other hand, in the small animal rearing container described in the aforementioned Patent Document 1, the front and rear walls and the right and left walls, i.e., surrounding four side walls, are each constituted by a flat transparent plate. At each corner portion of the surrounding four side walls, the side edges of adjacent side walls are coupled via a connection frame. For this reason, the inner side of the corner portion becomes a blind spot as seen from the outside of the container, resulting in insufficient viewing of the small animal staying at the corner portion in the rearing container from the outside of the container.

Further, in a small animal rearing container, a stress is likely to concentrate on the corner portion between adjacent side walls, and therefore the corner portion is required to have a sufficient strength. However, in the conventional small animal rearing container described in the aforementioned Patent Document 1, the side edges of the adjacent side walls are coupled at the corner portion via the connection frame. Therefore, the corner portion includes several parts including, e.g., edges of the transparent plates and the connection frame. As a result, it is difficult to sufficiently secure the strength of the corner portion, which in turn causes deterioration of the overall strength of the rearing container.

The present invention was made in view of the aforementioned problems, and aims to provide a small animal rearing container capable of sufficiently viewing a small animal staying at a corner portion of the container and also capable of sufficiently securing strength of the corner portion.

Means for Solving the Problems

To attain the aforementioned objects, the present invention has the following configurations.

[1] A small animal rearing container includes a base formed into a substantially box shape with an opened upper end, the base including a bottom wall, and a rising portion formed along an outer edge of the bottom wall, a peripheral wall arranged on an outer edge of the base so as to surround four peripheral sides including front, rear, right and left peripheral sides, a fixing frame coupled to an upper end opening edge of the peripheral wall, and a cover plate coupled to the fixing frame in an openable and closable manner. The peripheral wall is constituted by a plurality of glass plate wall members coupled with each other in a circumferential direction. At least one of the peripheral wall and the rising portion is provided with a porous sheet having an air permeability. The cover plate is provided with a porous sheet having an air permeability. The peripheral wall is provided with a window plate in an openable and closable manner. The wall member constituting a corner portion and a vicinity of the corner portion of the peripheral wall among the plurality of wall members is constituted by a bent glass plate. A bent portion of the bent glass plate is arranged at the corner portion.

[2] The small animal rearing container as recited in the aforementioned Item 1, wherein all of the corner portions of the peripheral wall are each constituted by the bent portion of the bent glass plate.

[3] The small animal rearing container as recited in the aforementioned Item 1 or 2, wherein the wall members include a front wall intermediate member, a rear wall intermediate member, and one side wall peripheral member, and the other side wall peripheral member, wherein the front wall intermediate member constitutes an intermediate portion of a front wall of the peripheral wall except for both side end portions of the front wall, wherein the rear wall intermediate member constitutes an intermediate portion of a rear wall of the peripheral wall except for both side end portions of the rear wall, wherein the one side wall peripheral member constitutes, among the peripheral wall, one side wall, one side end portion of the front wall, and one side end portion of the rear wall, and is constituted by a bent glass plate continuously extending in a circumferential direction, and wherein the other side wall peripheral member constitutes, among the peripheral wall, the other side wall, the other side end portion of the front wall, and the other side end portion of the rear wall, and is constituted by a bent glass plate continuously extending in the circumferential direction.

[4] The small animal rearing container as recited in any one of the aforementioned Items 1 to 3, wherein the plurality of wall members are configured to be detachable.

[5] The small animal rearing container as recited in the aforementioned Item 4, wherein the plurality of wall members are formed to have shapes capable of being accommodated in the base in a disassembled manner.

[6] The small animal rearing container as recited in any one of the aforementioned Items 1 to 5, wherein the base is configured to store water therein.

Effects of the Invention

According to the small animal rearing container of the inventions [1] to [3], since the corner portion of the peripheral wall is constituted by a bent portion of a bent glass plate, there is no portion hindering the visibility, such as, e.g., a joint, at the corner portion. For this reason, even if a small animal that is being reared in the container stays at the corner portion without moving, a use can sufficiently view the small animal from the outside of the container. Further, since the corner portion of the peripheral wall is integrally formed without forming any joints, a sufficient strength of the corner portion can be secured. Further, since the fixing frame is coupled to the upper edge portion of the peripheral wall, the strength of the peripheral wall can be further improved. Further, since the peripheral wall is constituted by a glass plate excellent in scratch resistance, it is possible to effectively prevent occurrence of scratches, etc., on the peripheral wall by small animals. Further, the peripheral wall, the cover plate, etc., is provided with a porous sheet, and therefore the air permeability of the container can be secured sufficiently, which can adjust the inside of the container into an appropriate rearing environment for small animals.

According to the small animal rearing container of the present invention [4], by stacking the plurality of disassembled wall members, the entire container can be packaged in a compact manner, which enables effective transportation, storage, etc.

According to the small animal rearing container of the present invention [5], it can be packaged in a compact manner, which enables more effective transportation, storage, etc.

According to the small animal rearing container of the invention [6], by storing water in the base, it becomes possible to rear small animals without causing any trouble.

EMBODIMENTS FOR CARRYING OUT THE INVENTION

Figure 1:
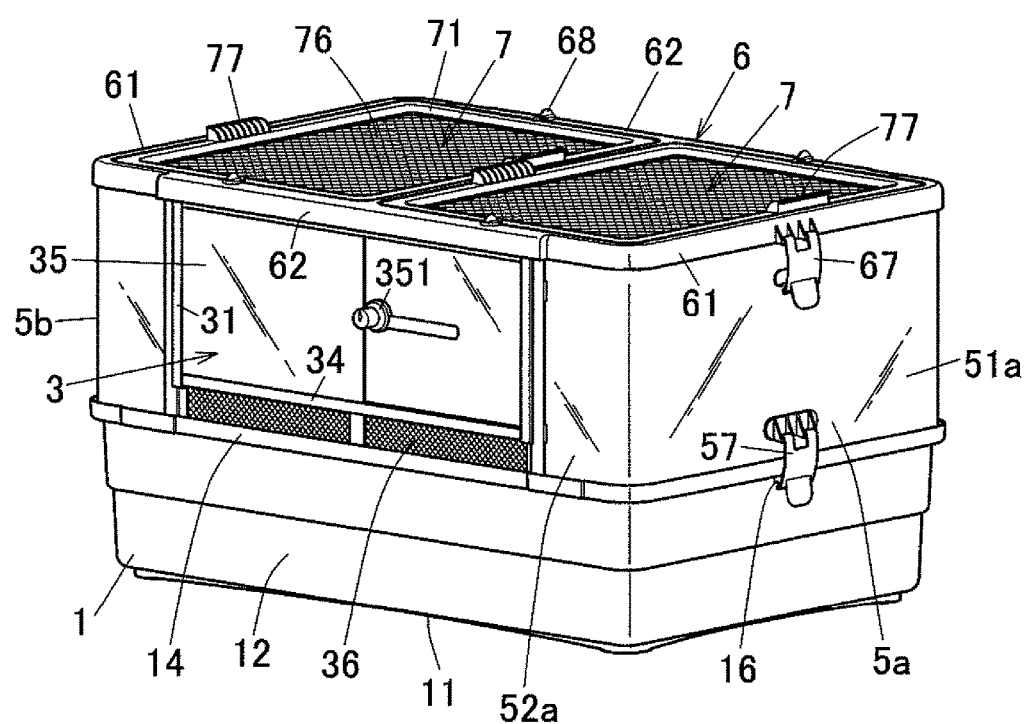
FIG. 1 is a perspective view of a small animal rearing container according to an embodiment of the present invention.

FIGS. 1 to 5 illustrate a small animal rearing container according to an embodiment of the present invention. As shown in these figures, this small animal rearing container is suitable for rearing relatively minor small animals, such as, e.g., turtles, snakes, lizards, scorpions, snails, and dragonflies, especially suitable for rearing turtles among these small animals.

This small animal rearing container is provided with a base 1, a peripheral wall 2 to be arranged on the outer edge of the base 1, a fixing frame 6 to be coupled to the upper end portion of the peripheral wall 2, a cover plate 7 to be coupled to the fixing frame 6, and an inner tray 78 to be arranged inside the rearing container. The peripheral wall 2 is constituted by a plurality of wall members including a front wall intermediate member 3, a rear wall intermediate member 4, one side wall peripheral member 5a, and the other side wall peripheral member 5b.

Figure 3:
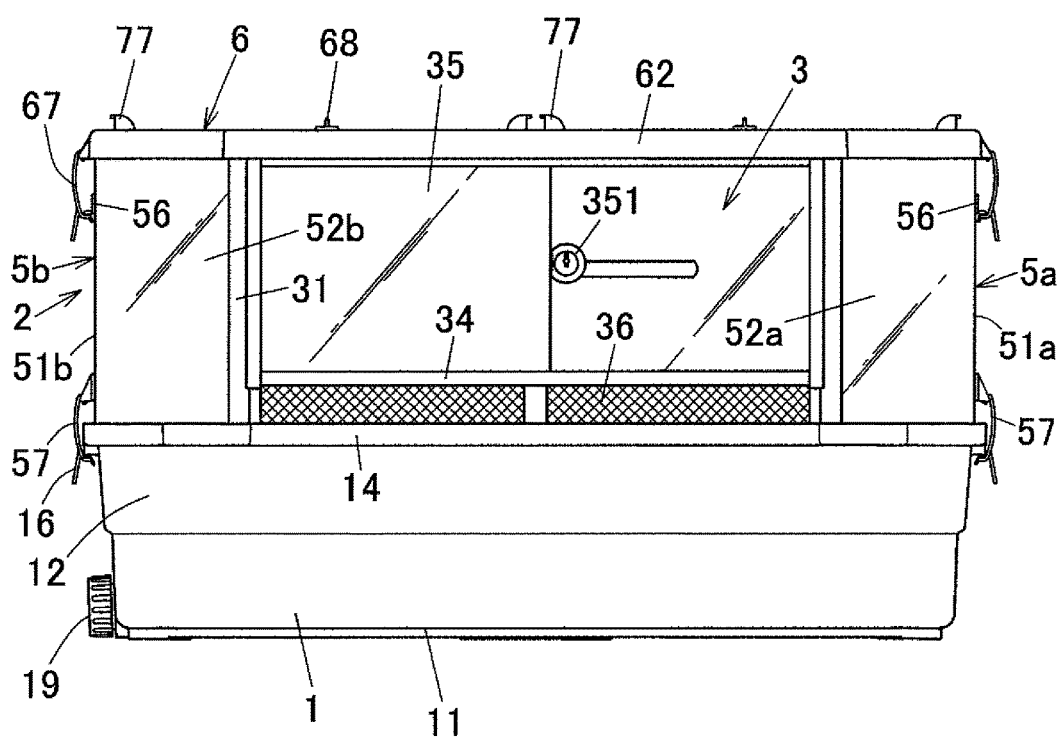
FIG. 3 is a front view of the small animal rearing container according to the embodiment.
Figure 4:
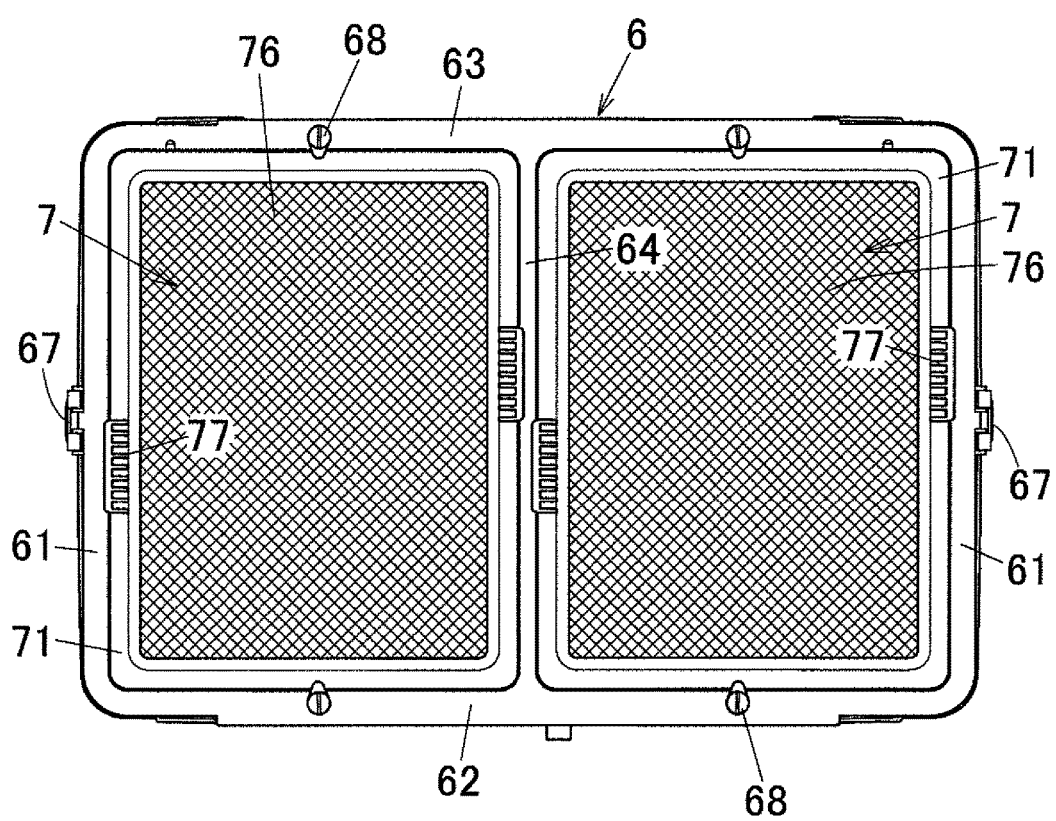
FIG. 4 is a top view of the small animal rearing container according to the embodiment.
Figure 5:
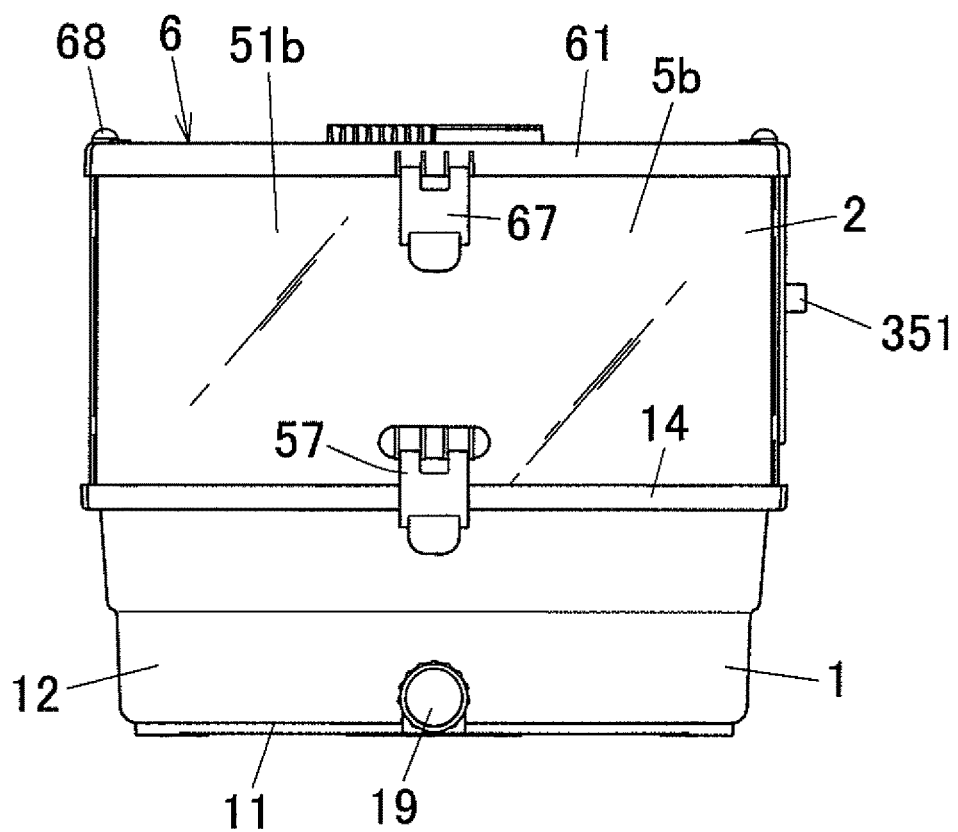
FIG. 5 is a side view of the small animal rearing container according to the embodiment.

In this specification, to facilitate understanding of the invention, the right side with respect to the front view shown in FIG. 3 will be referred to as one side, and the left side will be referred to as the other side. Further, with respect to the top view shown in FIG. 4, the lower side will be referred to as a front side, and the upper side will be referred to as a rear side.

The base 1 is integrally provided with a bottom wall 11 having a rectangular shape in a plan view, and a rising portion 12 upwardly extending from the peripheral portion of the bottom wall 11, and is constituted by a box-shaped integrally molded article made of hard synthetic resin with an opened upper end. This base 1 has water-tightness, so that water can be stored therein.

At the side portion of the base 1, a drain port (not illustrated) is formed, and a drain valve 19 is screwed in the drain port to be secured thereto. In a state in which water is stored in the base 1, by detaching the drain valve 19 from the drain port by the rotational operation, the water stored in the base 1 will be discharged through the drain port. By fixedly screwing the drain valve 19 in the drain port, the water discharging will be stopped.

Figure 6:
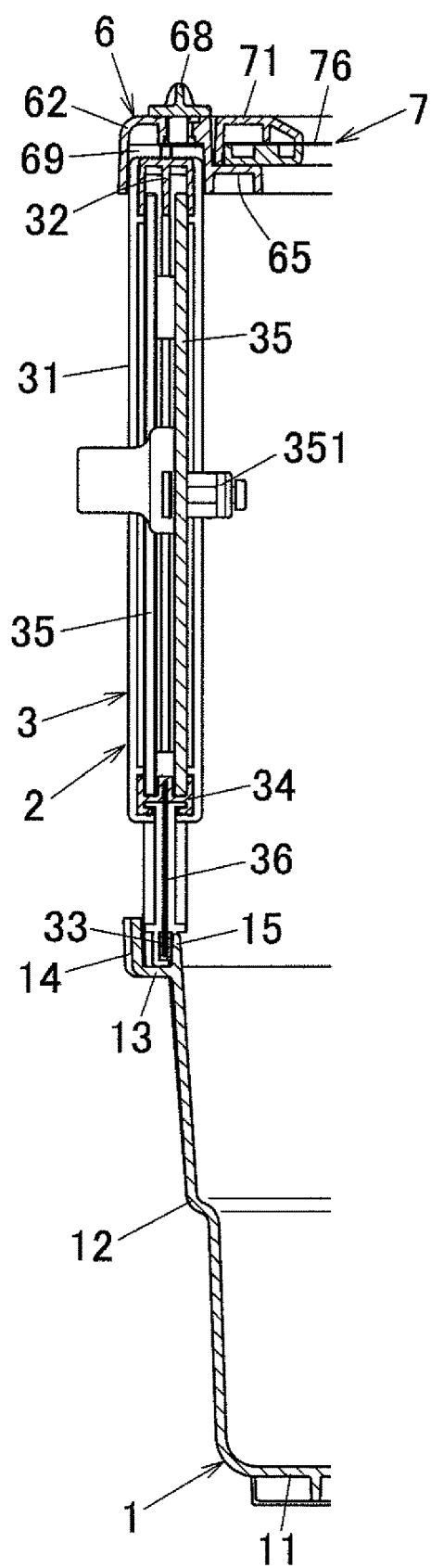
FIG. 6 is a side cross-sectional view of a front portion of the small animal rearing container according to the embodiment.

As shown in FIG. 6, at the upper edge portion of the rising portion 12 of the base 1, a peripheral wall mounting portion 13 extending horizontally outward is provided. At the outer edge of the peripheral wall mounting portion 13, an outer cover 14 is provided so as to extend vertically upward. Further, at the inner peripheral edge portion of the peripheral wall mounting portion 13, a plurality of protrusions 15 are provided at intervals in the circumferential direction.

As shown in FIGS. 1 to 5, at the upper ends of both side outer surfaces of the rising portion 12 of the base 1, hook receivers 16 are provided.

The peripheral wall 2 is formed to have an approximately rectangular shape in a plan view so as to surround peripheral four sides including the front side, the rear side, and both right and left sides above the base 1.

As described above, the peripheral wall 2 is provided with the front wall intermediate member 3, the rear wall intermediate member 4, and the one side wall peripheral member 5a and the other side wall peripheral member 5b constituting both side wall peripheral members.

Figure 7:
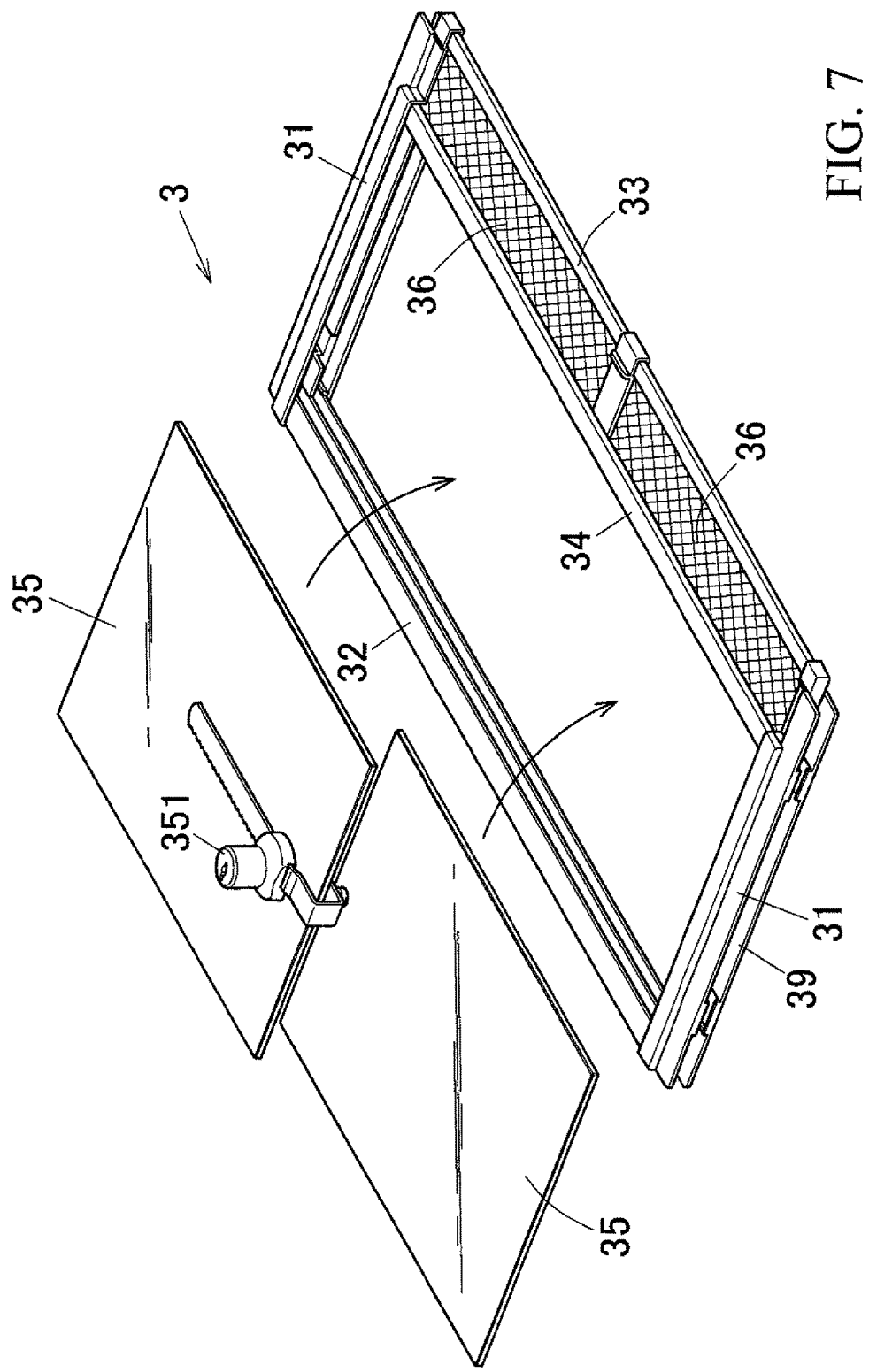
FIG. 7 is a perspective exploded view of the front wall intermediate member of the small animal rearing container according to the embodiment of the present invention.

The front wall intermediate member 3 constitutes an intermediate portion of the front wall of the peripheral wall 2 excluding both side end portions of the front wall. As shown in FIG. 7, this front wall intermediate member 3 is provided with both side frames 31 and 31, an upper frame 32, a lower frame 33, and an intermediate frame 34, window plates 35 and 35, and mesh sheets 36.

Both the side frames 31 and 31 are arranged along both side edges of the front wall intermediate member 3. The upper frame 32 is arranged along the upper end edge of the front wall intermediate member 3, and both end portions of the upper frame 32 are fixedly coupled to the upper end portions of both the side frames 31 and 31. The lower frame 33 is arranged along the lower end edge of the front wall intermediate member 3, and both end portions of the lower frame 33 are fixedly coupled to the lower end portions of both the side frames 31 and 31. Further, the intermediate frame 34 is arranged in parallel to the lower frame 33 so as to be positioned slightly above the lower frame 33, and both end portions of the intermediate frame 34 are fixedly coupled to both side frames 31 and 31.

The window plates 35 and 35 are arranged between the upper frame 32 and the intermediate frame 34 in a slidably movable manner in the horizontal direction (right-left direction). By sliding the window plates 35 and 35, the opening section (window opening) surrounded by both the side frames 31 and 31, the upper frame 32, and the intermediate frame 34 can be opened and closed. Therefore, in a state in which the window plates 35 are opened, the inside of the rearing container is communicated with the outside via the opening section. In this embodiment, each window plate 35 is made of a flat transparent glass plate.

A locking mechanism 351 for locking the window plates 35 in a state in which the window opening is closed is provided.

The mesh sheet 36 is fixedly arranged in a frame constituted by both the side frames 31 and 31, the lower frame 33, and the intermediate frame 34. In this embodiment, the mesh sheet 36 is constituted by a metal net-like sheet, so that the air permeability in the rearing container can be secured via this mesh sheet 36.

In this embodiment, as a porous sheet, the mesh sheet 36 is used, but not limited to it. In the present invention, as a porous sheet, various members, such as, e.g., a plate member having a number of through-holes, an expanded metal sheet, and a member in which bars are combined in a reticular pattern, can be used. Further, the material of the porous sheet is not limited to metal, and the porous sheet may be made of, for example, synthetic fibers or natural fibers.

Further, both the side frames 31 and 31 of the front wall intermediate member 3 are each provided with a mounting groove 39 opening outwardly.

Figure 8:
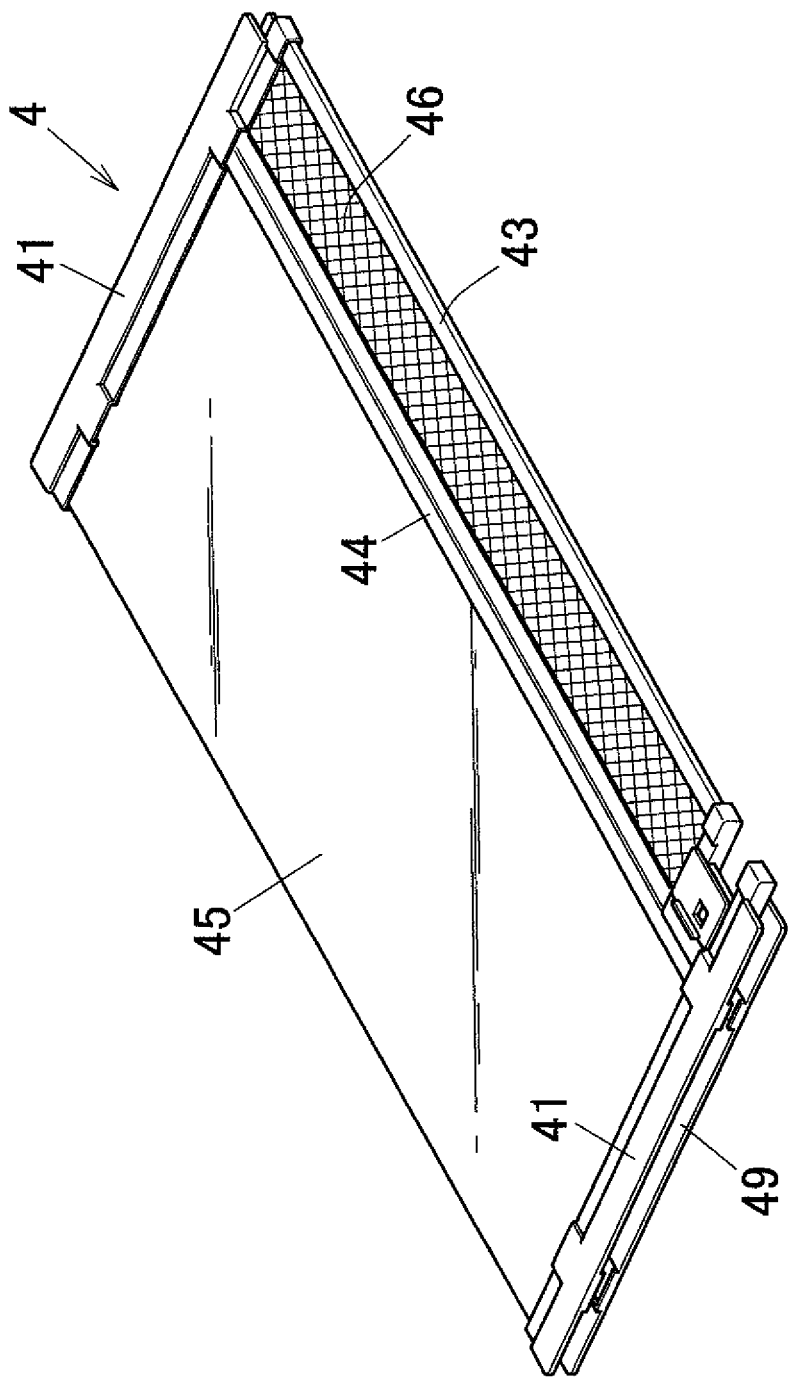
FIG. 8 is a perspective view of the rear wall intermediate member of the small animal rearing container according to the embodiment of the present invention.

As shown in FIG. 8, the rear wall intermediate member 4 constitutes an intermediate portion of the rear wall (back wall) of the peripheral wall 2 excluding both side end portions of the rear wall. The rear wall intermediate member 4 is provided with both side frames 41 and 41, a lower frame 43, an intermediate frame 44, a transparent plate 45, and a mesh sheet 46.

Both the side frames 41 and 41 are arranged along both side edges of the rear wall intermediate member 4. The lower frame 43 is arranged along the lower end edge of the rear wall intermediate member 4, and both end portions of the lower frame 43 are fixedly coupled to the lower end portions of both the side frames 41 and 41. Further, the intermediate frame 44 is arranged in parallel to the lower frame 43 so as to be positioned slightly above the lower frame 33, and both end portions of the intermediate frame 44 are fixedly coupled to both the side frames 41 and 41.

The transparent plate 45 is fixed to the intermediate frame 44 between both side frames 31 and 31. In this embodiment, the transparent plate 34 is constituted by a flat transparent glass plate.

In this embodiment, it can be configured such that the rear wall intermediate member 4 is provided with an openable and closable window in the same manner as in the aforementioned front wall intermediate member 3.

The mesh sheet 46 is fixedly arranged within a frame constituted by both the side frames 41 and 41, the lower frame 43 and the intermediate frame 44. In this embodiment, the mesh sheet 46 is constituted by a metal net-like sheet in the same manner as in the aforementioned mesh sheet 36, so that the air permeability in the rearing container can be secured via this mesh sheet 46.

In this embodiment, as a porous sheet, the mesh sheet 46 is used, but not limited to it. In the present invention, in the same manner as in the aforementioned mesh sheet 36, as a porous sheet, various members, such as, e.g., a plate member having a number of through-holes, an expanded metal sheet, and a member in which bars are combined in a reticular pattern, can be used. Further, the material of the porous sheet is not limited to metal, and the porous sheet can be constituted by, for example, synthetic fibers, or natural fibers.

Further, both the side frames 41 and 41 of the rear wall intermediate member 4 are each provided with a mounting groove 49 opening outwardly.

The one side wall peripheral member 5a constitutes, among the peripheral wall 2, the entire area of the one side wall 51a, one side end portion 52a of the front wall, and one side end portion 53a of the rear wall.

The one side wall peripheral member 5a is constituted by a transparent bent glass plate formed by bending the front wall one side end portion 52a and the rear wall one side end portion 53a with respect to the one side wall 51a. The bent processed portions (bent portions) of the bent glass plate are arranged at the respective corners between the one side wall 51a and the front wall one side end portion 52a of the peripheral wall 2 and between the one side wall 51a and the rear wall one side end portion 53a of the peripheral wall 2. Thus, the front wall one side end portion 52a, the one side wall 51a, and the rear wall one side end portion 53a of the peripheral wall 2 are continuously formed in the circumferential direction in a seamless manner.

In this embodiment, the bent glass plate may be formed by, for example, performing a bending work by a thermal treatment against a flat glass plate.

At a lower section of the outer surface of the one side wall 51a of the one side wall peripheral member 5a, a hook 57 corresponding to the hook receiver 16 is attached in a swingable manner. Further, above the hook 57, a hook receiver 56 is attached.

Further, each side end edge of the front wall one side end portion 52a and the rear wall one side end portion 53a of the one side wall peripheral member 5a is provided with a seal member 55.

The other side wall peripheral member 5b is arranged so as to face the one side wall peripheral member 5a, and has the same structure as the one side wall peripheral member 5a.

That is, the other side wall peripheral member 5b constitutes the entire area of the other side wall 51b, the other side end portion 52b of the front wall, and the other side end portion 53b of the rear wall of the peripheral wall 2. The other side wall peripheral member 5b is constituted by a transparent bent glass plate formed by, in the same manner as in the aforementioned one side wall peripheral member 5a, bending the front wall other side end portion 52b and the rear wall other side end portion 53b with respect to the other side wall 51b. The bent processed portions (bent portions) of the bent glass plate are arranged at the respective corner portions between the other side wall 51b and the front wall other side end portion 52b of the peripheral wall 2 and between the other side wall 51b and the rear wall other side end portion 53b of the peripheral wall 2. Thus, the front wall other side end portion 52b, the other side wall 51b, and the rear wall other side end portion 53b of the peripheral wall 2 are continuously formed in the circumferential direction in a seamless manner.

Further, the other side wall peripheral member 5b is provided with a seal member 55, a hook receiver 56, and a hook 57 in the same manner as in the one side wall peripheral member 5a.

In this embodiment, the front wall intermediate member 3, the rear wall intermediate member 4, and both side wall peripheral members 5a and 5b are assembled to thereby constitute the peripheral wall 2. That is, the mounting groove 39 and 49 (see FIGS. 7 and 8) is formed at the side of each side frame 31 of the front wall intermediate member 3 and the side of each side frame 41 of the rear wall intermediate member 4. The one side wall peripheral member 5a and the other side wall peripheral member 5b are arranged in a state in which the seal members 55 and 55 (see FIG. 2) coupled to the edge ends of the one side wall peripheral member 5a and the other side wall peripheral member 5b are fitted in the corresponding mounting grooves 39 and 49. Thus, the peripheral wall 2 is assembled.

The lower end peripheral portion of the peripheral wall 2 is arranged on the peripheral wall mounting portion 13 of the rising portion 12 of the base 1. In this state, the lower end peripheral portion of the peripheral wall 2 is arranged between the outer cover 14 and the protrusions 15 of the base 1, and therefore the positional displacement of the peripheral wall 2 in the horizontal direction with respect to the base 1 is prevented.

Further, in this state, when the hook 57 of the peripheral wall 2 is pressed toward the hook receiver 16 of the base 1, the hook 57 is elastically engaged with the hook receiver 16. With this, the peripheral wall 2 is secured to the base 1.

In the present invention, the assembling order of the peripheral wall 2 to the base 1 is not limited.

In order to detach the peripheral wall 2 secured to the base 1 from the base 1, the hook 57 is strongly pulled outward. With this, the engagement of the hook 57 and the hook receiver 16 is released, and therefore the peripheral wall 2 can be detached from the base 1.

As shown in FIGS. 1 to 5, the fixing frame 6 is constituted by a plastic molded article including both side frames 61 and 61, a front frame 62, a rear frame 63, and a reinforcement frame 64.

At the outer sides of both side frames 61 and 61 of the fixing frame 6, hooks 67 and 67 are provided in a swingable manner.

Figure 2:
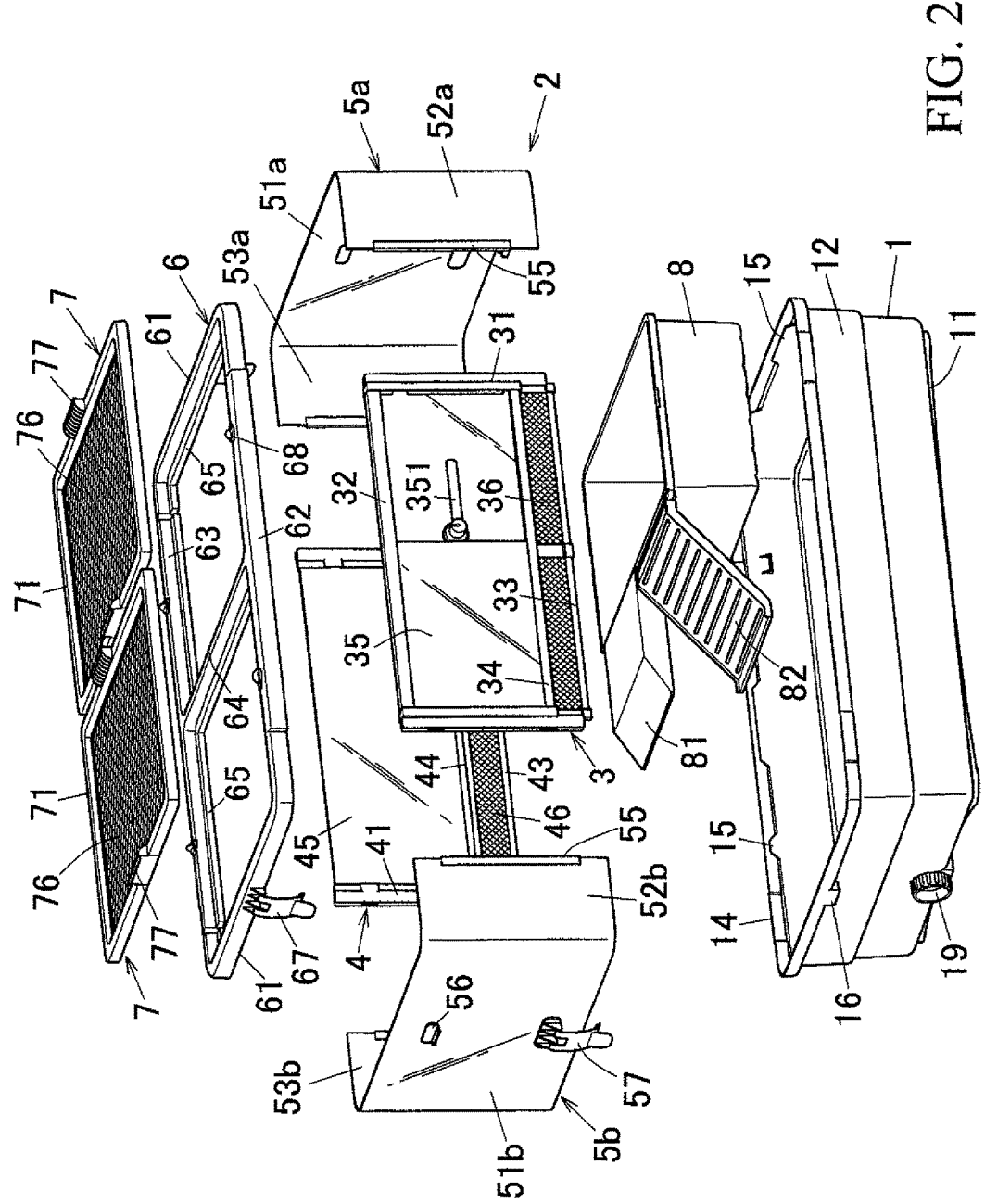
FIG. 2 is a perspective view of the small animal rearing container in an exploded state according to the embodiment of the present invention.

The fixing frame 6 is provided with two opening sections partitioned by the reinforcement frame 64 within the fixing frame. Further, as shown in FIGS. 2 and 6, at the inner side of the opening edge portion of the fixing frame 6, an inwardly protruded cover plate mounting ledge 65 is formed.

Further, at the lower surface side of both side frames 61 and 61, the front frame 62 and the rear frame 63 of the fixing frame 6, a downwardly opened mounting groove 69 is formed continuously in the circumferential direction.

This fixing frame 6 is arranged on the upper end portion of the peripheral wall 2. With this, the upper edge portion of the peripheral wall 2 is fitted in the mounting groove 69 of the fixing frame 6 to position the fixing frame 6.

In this state, by pressing the hooks 67 and 67 of the fixing frame 6 toward the hook receivers 56 and 56, the hooks 67 and 67 are elastically engaged with the hook receivers 56 and 56. With this, the fixing frame 6 is fixed to the peripheral wall 2.

When detaching the fixing frame 6 from the peripheral wall 2, the hook 67 is strongly pulled outward. With this, the engagement of the hook 67 and the hook receiver 56 is released, and therefore the fixing frame 6 can be detached from the peripheral wall 2.

Cover plates 7 and 7 to be arranged at two opening sections of the fixing frame 6 are each provided with a rectangular frame 71 made by a plastic molded article and a mesh sheet 76 closing the opening section in the fixing frame 6.

The mesh sheet 76 has a configuration similar to the mesh sheets 36 and 46 of the front wall intermediate member 3 and the rear wall intermediate member 4. The rectangular frame 71 of each of the cover plates 7 and 7 is provided with two handles 77.

The cover plates 7 and 7 are arranged on the cover plate mounting ledges 65 of the fixing frame 6 so as to close two opening sections of the fixing frame 6.

At the upper surface side of the front frame 62 and the rear frame 63 of the fixing frame 6, locking levers 68 are provided in a rotatable manner. Each rocking lever 68 is configured to be operated rotatably between the state in which the locking lever is positioned on the rectangular frame 71 of the cover plate 7 and the state in which the locking lever is detached outward from the rectangular frame 71. In a state in which the locking lever 68 is positioned on the cover plate 7, the locking lever 68 is engaged with the upper surface of the cover plate 7. Therefore in this state, the cover plate 7 cannot be detached from the fixing frame 6, which keeps the state in which the opening section of the fixing frame 6 is closed by the cover plate 7. Further, in a state in which the locking lever 68 is detached from the cover plate 7, the locking lever 68 is not engaged with the cover plate 7. Therefore in this state, the cover plate 7 can be detached from the fixing frame 6, which in turn can open the opening section of the fixing frame 6.

As shown in FIG. 2, an interior tray 8 to be arranged inside the rearing container is made of a box-shaped container having an opened upper end. In this interior tray 8, the bottom wall and the peripheral wall are integrally formed so as not to leak water. Therefore, the interior tray 8 can store water. This interior tray 8 is formed to have a size capable of being partially fitted to an inside of the base 1.

At the upper edge portion of the interior tray 8, a horizontal platform 81 is integrally formed so as to protrude outward. This horizontal platform 81 is configured so that a small animal to be reared in the rearing container can use as a comfortable staying place, etc.

The interior tray 8 is further provided with a slope plate 82. One end of this slope plate 82 is detachably coupled to the upper end of the opening edge portion of the interior tray 8, and the other end thereof is arranged on the bottom surface of the base 1 outside the interior tray 8. Therefore, a small animal can come and go between the outside of the interior tray 8 in the base 1, the inner side of the interior tray 8, and the horizontal platform 81 by going up and down the slope plate 82. Especially, in cases where water is stored in the base 1 and gravels, etc., are laid in the interior tray 8, a small animal can easily move from under water to a land in the interior tray 8 by climbing the slope plate 82.

The slope plate 82 may be attached inside the interior tray 8. That is, it can be configured such that one end of the slope 8 is detachably coupled to the inner side of the upper end of the opening edge portion of the interior tray 8, and the other end thereof is arranged on the inner bottom surface of the interior tray 8.

Figure 9:
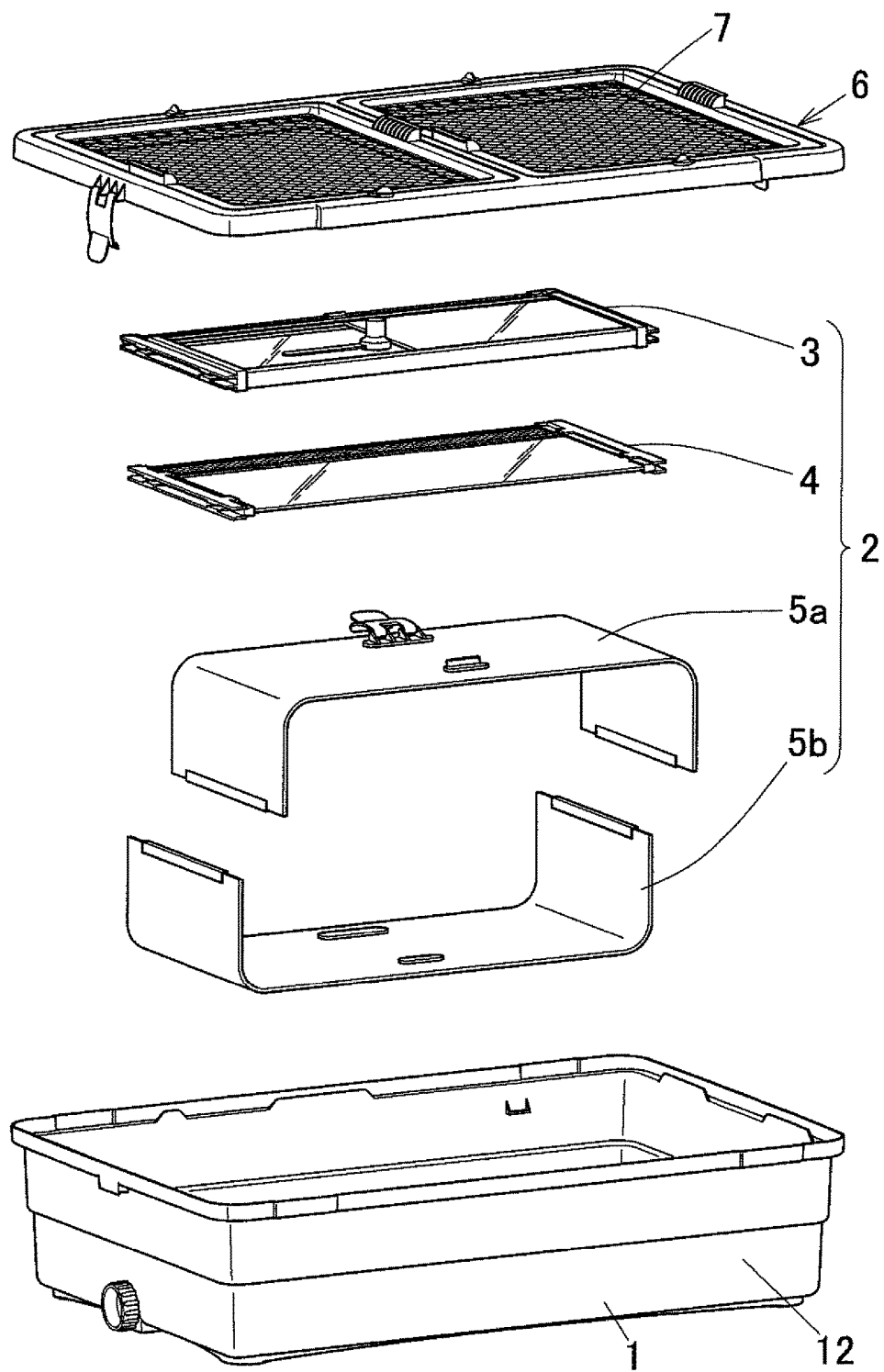
FIG. 9 is a perspective view for explaining a packaging state of the small animal rearing container according to the embodiment of the present invention.

As shown in FIG. 9, in a state in which the small animal rearing container is disassembled, the front wall intermediate member 3, the rear wall intermediate member 4, and both side wall peripheral members 5a and 5b can be accommodated in the base 1 by stacking them in a laid state. Further, in the accommodated state, the fixing frame 6 having the cover plates 7 and 7 can be arranged at the upper end opening section of the base 1. By securing the fixing frame 9 to the base 1 in this compact stacked state, the container can be in a compact packaged manner. Further, in this embodiment, as needed, it can be configured such that the interior tray 8 is accommodated in the base 1.

In this embodiment, when packaging the rearing container, the positions, directions, etc., of the front wall intermediate member 3, the rear wall intermediate member 4, both side wall peripheral members 5a and 5b, etc., are not limited.

In the small animal rearing container according to the embodiment structured as described above, since the corner portions of the peripheral wall 2 are constituted by bent portions of a bent glass plate as both the side wall peripheral members 5a and 5b, a member hindering the visibility, such as, e.g., a frame, does not exist at the corner portions. For this reason, even if a small animal reared in the container stays at the corner portion without moving, a use can assuredly view the small animal. Therefore, according to the small animal rearing container of this embodiment, small animals can be sufficiently viewed and reared without causing any trouble.

Further, in this embodiment, since the corner portion of the peripheral wall 2 is constituted by the bent portion of the bent glass plate, the corner portion is integrally formed in a seamless manner, increasing the strength of the corner portion, which in turn can increase the strength of the entire container. Thus, it is possible to prevent breakages or damages of the rearing container, which can improve the durability of the rearing container.

Especially, in this embodiment, all of the corner portions of the peripheral wall 2 are formed by the bent portions of the bent glass plate. Therefore, a user can more assuredly view a small animal, and the strength of the entire container can be further improved.

Further, in this embodiment, since the fixing frame 6 is coupled to the upper edge portion of the peripheral wall 2, the strength of the peripheral wall 2 can be further improved. Accordingly, it is possible to more assuredly prevent breakages or damages of the rearing container.

Further, in the small animal rearing container according to the embodiment, since the main part of the peripheral wall 2 is constituted by a glass plate, the durability can be improved as compared with the case in which the peripheral wall is constituted by, for example, a transparent hard synthetic resin plate. For this reason, according to the rearing container of the embodiment, it is possible to assuredly prevent occurring of scrapes, etc., on the peripheral wall 2 by small animals. Thus, the transparency of the peripheral wall 2 can be maintained at a high level for a long period of time.

Further, in the small animal rearing container according to the embodiment, since a part of the peripheral wall 2 is constituted by the mesh sheets 36 and 46 and the main part of the cover plate 7 is constituted by the mesh sheet 76. For this reason, the air permeability of the inside of the rearing container can be secured sufficiently via the mesh sheets 36, 46 and 76. Therefore, the humidity, the temperature, etc., in the rearing container can be adjusted appropriately, which can provide a comfortable rearing environment for small animals to be reared.

Further, in the small animal rearing container according to the embodiment, since the window plates 35 are coupled to the window frame (opening section) formed in the front face in a slidable manner, the opening section can be easily opened by simply sliding the window plates 35. For this reason, it is possible to feed or supply water to small animals via the opening section. Therefore, a user can easily perform operations such as feeding. Further, the ventilation in the container can be adjusted by the opening or closing operation by the window plates 35, which can further improve the air permeability.

Further, in the small animal rearing container of the embodiment, the height of the container can be easily changed effectively. For example, in the case of increasing the height of the container, as a peripheral wall 2 large in height, a higher front wall intermediate member 3, a higher rear wall intermediate member 4, and higher side wall peripheral members 5a and 5b are prepared. In place of the existing front wall intermediate member 3, rear wall intermediate member 4, side wall peripheral members 5a and 5b, a higher front wall intermediate member 3, a higher rear wall intermediate member 4, and higher side wall peripheral members 5a and 5b are attached. By simply replacing only the peripheral wall 2 without changing the base 1, the fixing frame 6 and the cover plate 7, the height of the small animal rearing container can be increased effectively and easily. To the contrary, in the case of lowering the height of the small animal rearing container, in place of the existing peripheral wall 2, a lower peripheral wall 2 is attached.

Further, the small animal rearing container according to the embodiment, as shown in FIG. 9, it is possible to package the container in a compact manner. For this reason, in the case of displaying or storing the small animal rearing container according to the embodiment as a commercial product, the container can be arranged in a space effective manner by packaging the rearing container. Further, in the case of carrying the small animal rearing container according to the embodiment, since the rearing container does not become bulky by packaging the container, the carrying work can be performed easily.

Further, in this embodiment, water can be stored in the base 1 and/or the interior tray 8. For this reason, in the case of rearing small animals whose living area includes a waterfront or a shallow water, by storing water in the base 1 and/or the interior tray 8, it is possible to provide a comfortable rearing environment in which the animal can readily make its habitat.

In the aforementioned embodiment, it is configured such that the members of the peripheral wall 2, such as, the front wall intermediate member 3, the rear wall intermediate member 4, and the side wall peripheral members 5a and 5b, can be accommodated inside the base 1, but not limited to it. In the present invention, it may be configured such that some of the front wall intermediate member 3, the rear wall intermediate member 4, and side wall peripheral member 5a and 5b can be accommodated.

In this present invention, even in cases where all of wall members cannot be accommodated in the base 1, since the wall members constituting the peripheral wall 2 can be disassembled individually, the entire rearing container can be packaged in a compact manner by stacking these wall members.

In the aforementioned embodiment, the peripheral wall 2 is constituted by four wall members 3, 4, 5a, and 5b, but not limited to it. In the present invention, it is enough that the peripheral wall is constituted by at least two wall members continuously formed in the circumferential direction. For example, the peripheral wall can be constituted by two, three, five or more wall members. Further, the shape of each wall member is not limited, and each wall member can be formed into any shape.

The present application claims priority under to Japanese Patent Application No. 2014-006411, filed on Jan. 17, 2014, the contents of this application are incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

INDUSTRIAL APPLICABILITY

The small animal rearing container according to the present invention can be preferably used for rearing small animals mainly at home.

BRIEF DESCRIPTION OF THE REFERENCE SYMBOLS

1: base
11: bottom wall
12: rising portion
2: peripheral wall
3: front wall intermediate member
35: window plate
36: mesh sheet (porous sheet)
4: rear wall intermediate member
46: mesh sheet (porous sheet)
5a: one side wall peripheral member
51a: one side wall
52a: front wall one side end portion
53ba: rear wall one side end portion
5b: the other side wall peripheral member
51b: the other side wall
52b: front wall other side end portion
53b: rear wall other side end portion
6: fixing frame
7: cover plate
76: mesh sheet (porous sheet)

What is claimed is:

1. A small animal rearing container comprising:
a base formed into a substantially box shape with an opened upper end, the base including a bottom wall, and a rising portion formed along an outer edge of the bottom wall;
a peripheral wall arranged on an outer edge of the base so as to surround four peripheral sides including front, rear, right and left peripheral sides;
a fixing frame coupled to an upper end opening edge of the peripheral wall; and
a cover plate coupled to the fixing frame in an openable and closable manner,
wherein the peripheral wall is constituted by a plurality of glass plate wall members coupled with each other in a circumferential direction,
wherein at least one of the peripheral wall and the rising portion is provided with a porous sheet having an air permeability,
wherein the cover plate is provided with a porous sheet having an air permeability,
wherein the peripheral wall is provided with a window plate in an openable and closable manner,
wherein the wall member constituting a corner portion and a vicinity of the corner portion of the peripheral wall among the plurality of wall members is constituted by a bent glass plate, and
wherein a bent portion of the bent glass plate is arranged at the corner portion.

2. The small animal rearing container as recited in claim 1, wherein all of the corner portions of the peripheral wall are each constituted by the bent portion of the bent glass plate.

3. The small animal rearing container as recited in claim 1,
wherein the wall members include a front wall intermediate member, a rear wall intermediate member, and one side wall peripheral member, and the other side wall peripheral member,
wherein the front wall intermediate member constitutes an intermediate portion of a front wall of the peripheral wall except for both side end portions of the front wall, wherein the rear wall intermediate member constitutes an intermediate portion of a rear wall of the peripheral wall except for both side end portions of the rear wall, wherein the one side wall peripheral member constitutes, among the peripheral wall, one side wall, one side end portion of the front wall, and one side end portion of the rear wall, and is constituted by a bent glass plate continuously extending in a circumferential direction, and wherein the other side wall peripheral member constitutes, among the peripheral wall, the other side wall, the other side end portion of the front wall, and the other side end portion of the rear wall, and is constituted by a bent glass plate continuously extending in the circumferential direction.

4. The small animal rearing container as recited in claim 1, wherein the plurality of wall members are configured to be detachable.

5. The small animal rearing container as recited in claim 4, wherein the plurality of wall members are formed to have shapes capable of being accommodated in the base in a disassembled state.

6. The small animal rearing container as recited in claim 1, wherein the base is configured to store water therein.

\* \* \* \* \*